May 19, 1964

A. H. SCHLEICH 3,133,523

VIBRATING REED REMOTE CONTROL TRANSMITTER

Filed Sept. 11, 1961

INVENTOR:
ALLEN SCHLEICH,
BY Joseph Levinson
HIS ATTORNEY.

United States Patent Office 3,133,523

Patented May 19, 1964

3,133,523

VIBRATING REED REMOTE CONTROL TRANSMITTER

Allen H. Schleich, Mattydale, N.Y., assignor to General Electric Company, a corporation of New York Filed Sept. 11, 1961, Ser. No. 137,241

6 Claims. (Cl. 116—137)

Figure 1:
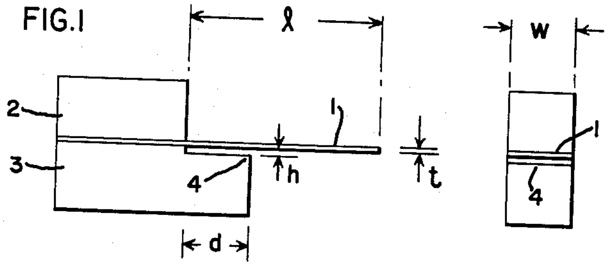

This invention relates to a remote control transmitter and more particularly to a vibrating reed remote control transmitter which generates a modulated ultrasonic signal by means of a vibrating reed.

Remote control systems have been employed extensively for remotely controlling a plurality of functions for television receivers and are finding increasing use for control of garage doors, heating apparatus and various electrical appliances. The remote control systems generally include a small transmitter, a stand-by receiver and circuits operated in response to receipt of a signal from the transmitter by the receiver for performing the desired functions. The circuits operated by the receiver may include such devices as relays, switches, motors or a combination of these which are adapted to be activated or deactivated by the receiver on the receipt of a signal of predetermined frequency. In operation the transmitter sends out a signal of the given frequency which is picked up by the receiver thereby activating the control circuit to perform the desired function. The transmitter is usually adapted for transmitting a plurality of frequencies and the number of frequencies capable of transmissions depends upon the number of functions to be controlled.

The expense, size and fragile nature of the remote transmitters are among a few of the drawbacks of the presently available remote control systems.

Accordingly, it is an object of this invention to provide a new and improved mechanical remote control transmitter which is simple to construct, occupies little space and costs little compared with other remote control transmitters.

One problem associated with remote control transmitters is the inability of the transmitter, particularly with respect to the mechanical type, to generate a signal distinctive enough to be sensed by the remote receiver to the exclusion of other signals. Faulty actuation of the control circuits by the receiver in response to noise or interference signals is, of course, highly objectionable. The failure of the transmitter to emit a distinctive type signal which is unlike other signals would tend to cause such undesired actuations.

It is another object of this invention to provide a new and improved mechanical transmitter which generates a distinctive modulated ultrasonic signal.

In carrying out this invention in one illustrative embodiment thereof, a resilient reed is mounted on a portion thereof for vibration at its natural resonant frequency. Means are provided for impacting the reed once it has been set into vibration for generating a modulated ultrasonic signal consisting of overtones of the fundamental resonant frequency of the reed modulated at a frequency corresponding to the fundamental resonant frequency of the reed.

The invention, both as to organization and method of operation, together with further objects and advantages thereof may best be understood by reference to the following description taken in connection with the accompanying drawings, in which:

FIGURE 1 shows a side elevation and an end view of the novel vibrating reed transmitter in one form of this invention.

Figure 2:
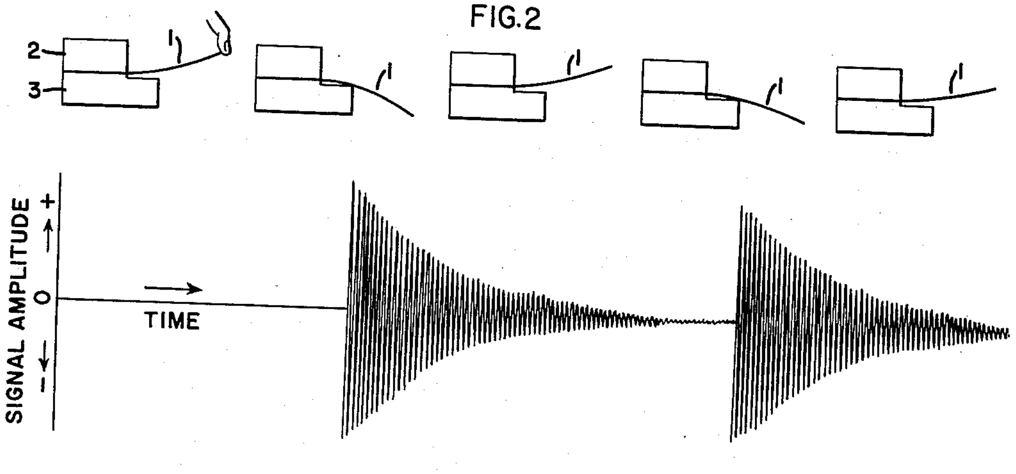
Figure 3:
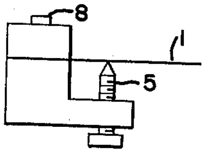
Figure 4:
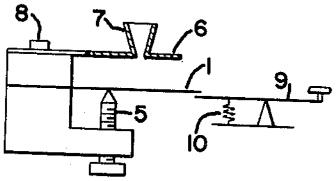

FIGURE 2 shows a graphic illustration (plotted in amplitude as a function of time) of the type of signal generated by the vibrating reed transmitter including diagrammatic representations of the positioning of the reed during various portions of the transmitted signal, FIGURE 3 shows a side elevation of another embodiment of the vibrating reed transmitter and FIGURE 4 shows a side elevation of the vibrating reed shown in FIGURE 3 together with actuating means and with a reflector means shown in section.

Referring now to FIGURE 1, the vibrating reed transmitter has in one form a thin resilient reed 1 which is sandwiched between and tightly clamped by two mounts of rigid material 2 and 3. The mount 3 is so shaped that it extends below the reed 1 a short distance *d* beyond the line or point of clamping. The device is operated by raising and releasing the free end of the reed by the finger or a suitable trigger mechanism. The beam then undergoes transverse oscillations at its natural resonant frequency. However, as the reed is oscillating at its fundamental natural frequency, it strikes the edge or impact point 4 once per each cycle of vibration. Each time the reed strikes the impact point 4, a number of higher modes of vibration each related to the fundamental mode are excited in the reed which are damped out either all or in part before the reed strikes impact point 4 again to begin a new cycle. FIGURE 2 shows in progression the type of signal generated for the various positions of the vibrating reed 1. As is shown in FIGURE 2, the higher modes of the fundamental frequency are excited when the reed comes in contact with the impact point 4 and are damped out until the impact point 4 is again reached by the reed thereby exciting the same mode in repetitive fashion. This action results in an ultrasonic signal modulated at a frequency corresponding to the fundamental resonant frequency of the reed.

The free vibration of a clamped reed or cantilever beam would normally be at a fundamental frequency and various overtones or higher modes which are fixed by the configuration of the vibrating member and the method used for exciting vibration. Generally, these overtones would be quickly damped and rarely noticed and would not be suitable for remote control purposes. By suitably locating an impact point or impactor 4 as shown in FIGURE 1, which distorts the shape of the deflected reed, this distorted deflection produces overtones of the fundamental frequency, and the overtones are repetitive during some portion of each cycle of vibration of the reed. The first mode of fundamental frequency of the vibrating reed is also increased by the effective shortening of the free length of the reed during contact with the impact point or impactor.

The importance of the overtones which are generated by the transmitter of FIGURE 1 is their high frequency compared with the fundamental frequency of the reed. By utilizing a reed which, for example, vibrates at a fundamental natural frequency of 300 cycles per second and exciting the seventh mode frequency or 35,500 cycles per second, an acoustic signal can be derived with a carrier frequency of 35,500 cycles per second and a modulating frequency of 300 cycles per second. Similarly several reeds having different natural resonant frequencies can be excited using higher mode frequencies as the carriers to provide a plurality of modulated ultrasonic control signals.

By the proper location of the impact point, the signal can be optimized, and will thus operate a receiver at a greater distance than if the impact point is in a poor position. In general the best results are obtained when the impact point is less than half way from the clamping point. Thus *d* is less than one-half where *d* is the distance from the clamping point to the impact point and 1 represents the length of the reed from the clamping point to its free end or the portion of the reed which is free to vibrate. The frequency modulation and the carrier frequencies are determined largely by the materials used, the reed free length 1, the distance *d*, the spacing *h*, the shape of the reed cross section (i.e., for a rectangular cross section the width *w* and the thickness *t*; for a circular cross section the diameter of the reed), the shape of the point or surface of the contact 4, and the method of triggering.

It can now be seen that the addition of the impact point to the cantilever or fixed-free end reed creates a new system with a fundamental frequency higher than a simple cantilever beam system alone. Although a number of variables exist, the extreme alteration of which might change the transmitter's operation several general observations are made with respect to the transmitter operation which are valid under normal operation. The greater the value of *d* or the smaller the value of *h* which is the distance between the reed and the impact point, the higher the fundamental frequency. The smaller the value of *d* the deeper the modulation of the signal and the smaller the amplitude of the signal. High initial deflection of the reed greatly increases the signal amplitude but causes a noticeable change in fundamental frequency of the reed 1 during operation. The sharper and more rigid the impact point the cleaner and longer the signal and the shorter the life of the reed. The greater the ratio of the clamp mass to the reed mass, the cleaner and longer the signal. The smaller the values of *t* and *w* as shown in FIGURE 1, the cleaner the signal. However, the highest signal amplitude appears to occur when the reed is one-half the desired ultrasonic wave length wide (approximately 3/16 of an inch for a 35 to 40 kc. signal).

FIGURE 3 shows another configuration in which the impact point or impactor 4 is replaced by an impactor 5 which is more suitable for actuating a pure signal because of a sharper point and a more limited area of contact.

FIGURE 4 shows the vibrating reed transmitter embodied in this invention having an actuating means consisting of a lever 9 which when pressed contacts the underside of the reed 1 and lifts it for deflective purposes. The lever 9 is returned to its initial position subsequently by a spring 10 once the reed has been set into vibration and has transmitted the desired signal. The reed 1 having many sound sources will generate several signals in different directions and cause interference patterns resulting in strong signals along two or more directions and almost no signal between other instead of one desired strong signal in one general direction. This has been alleviated in FIGURE 4 by using a reflector 6 for blocking off most of the reed and a conical horn 7 for picking up and directing a strong signal toward a remote receiver. The reflector 6 is secured to the mounting structure by a screw 8.

The vibrating reed transmitter requires only one vibrating element for generating both the ultrasonic signal and the modulating vibration to produce a rapidly damped high frequency signal which may be utilized for remote control purposes. A plurality of units can be used for transmitting signals of different frequencies for actuating remote receivers to provide multi-function operation. A plurality of reeds having the same fundamental resonant frequency can be used by accentuating different overtones by suitable location of impactors, reflectors, and horns, or a plurality of different reeds can be used having differend fundamental resonant frequencies and utilizing the overtones desired.

The vibrating reed transmitter fulfills the need of a low cost transmitter to operate remote control receivers. The device is simple to construct, occupies little space and costs little compared with other remote control transmitters. It generates a distinctive type signal which with proper cooperating receiver circuitry can produce a noise immune circuit for remote control which prevents undesired actuation.

Since other modifications and changes varied to fit particular operating requirements and environments will be apparent to those skilled in the art, this invention is not considered limited to the examples chosen for purposes of disclosure and covers all changes and modifications which do not constitute a departure from the true spirit and scope of this invention.

What I claim as new and desire to secure by Letters Patent of the United States is:

1. An ultrasonic transmitter for generating a modulated ultrasonic signal comprising a resilient reed having a fundamental resonant frequency, means for mounting said reed on one end portion thereof leaving the remainder of the reed free to vibrate at its fundamental resonant frequency, means for actuating the free portion of said reed into vibration, a relatively rigid means which is impacted by said reed at a point between the free end and the mounted end of said reed for generating a modulated ultrasonic signal consisting of an overtone of said fundamental resonant frequency modulated at a frequency corresponding to said fundamental resonant frequency.

2. A transmitter for generating a modulated ultrasonic signal comprising a resilient reed having a resonant frequency, mounting means for said reed, means for tightly clamping said reed in said mounting means to allow said reed to vibrate when actuated to generate said resonant frequency, a relatively rigid means which is struck by said reed during vibration to generate higher modes of vibration each related to said resonant frequency to produce a modulated ultrasonic signal modulated at a frequency corresponding to the resonant frequency of said reed.

3. A transmitter for generating a modulated ultrasonic signal comprising a resilient reed having a fundamental resonant frequency, means for mounting said reed on one end portion thereof thereby allowing the free length to vibrate when actuated, means for actuating said reed into vibration for generating the fundamental resonant frequency of said reed, a relatively rigid means which is contacted by said reed during at least a portion of each cycle of vibration of said reed thereby exciting higher modes of vibration related to said fundamental resonant frequency to produce a modulated ultrasonic signal having a carrier frequency corresponding to one of said higher modes of vibration and a modulating frequency corresponding to the fundamental resonant frequency of said reed.

4. The transmitter set forth in claim 3 including means for selecting and directing the modulated ultrasonic signal desired.

5. A transmitter for generating a modulated ultrasonic signal comprising a reed having a fundamental resonant frequency, means for tightly mounting said reed on one end portion thereof, leaving the free end free to vibrate at its fundamental resonant frequency, means for exciting said reed into vibration for generating said fundamental resonant frequency, a relatively rigid impactor which is contacted by said reed at least once during each cycle of vibration to generate higher modes of vibration each related to said fundamental resonant frequency to produce a modulated ultrasonic signal having a carrier frequency of one of said higher modes of vibration and a modulating frequency similar to said fundamental resonant frequency, and means for directing said modulated ultrasonic signal.

6. The transmitter set forth in claim 5 wherein said impactor is positioned less than one half the distance from mounting point to the free-end of the reed.

References Cited in the file of this patent

UNITED STATES PATENTS

| | | |
|---|---|---|
| 2,563,877 | Sfreddo | Aug. 14, 1951 |
| 2,582,441 | Kunz | Jan. 15, 1952 |

FOREIGN PATENTS

| | | |
|---|---|---|
| 811,334 | Germany | Aug. 20, 1951 |
| 1,205,837 | France | Aug. 24, 1959 |